United States Patent [19]

De Young

[11] Patent Number: 4,609,924

[45] Date of Patent: Sep. 2, 1986

[54] BUFFER RESERVOIR FOR INK JET APPARATUS AND METHOD

[75] Inventor: Thomas W. De Young, Stormville, N.Y.

[73] Assignee: Exxon Printing Systems, Inc., Brookfield, Conn.

[21] Appl. No.: 661,034

[22] Filed: Oct. 15, 1984

[51] Int. Cl.[4] .......................................... G01D 15/16

[52] U.S. Cl. ................................ 346/1.1; 346/140 R

[58] Field of Search .................... 346/140 PD, 140 IJ, 346/140 R, 75, 1.1; 400/126; 106/20, 30, 31

[56] References Cited

U.S. PATENT DOCUMENTS 3,653,932 4/1972 Berry et al. ...................... 346/1.1 X 4,178,595 12/1979 Jinnai et al. .................. 346/140 PD

OTHER PUBLICATIONS

Owens, "New Ink-Writing Methods for Graphic Recording", Instruments & Control Systems, vol. 38, pp. 100–102, Jul. '65.

*Primary Examiner*—E. A. Goldberg

*Assistant Examiner*—M. Reinhart

[57] ABSTRACT

Hot melt ink is maintained in a solid state at a fixed location along with a smaller quantity of liquid ink in a buffer reservoir at the same location. When ink is called for in the reservoir of a scanning imaging head, the head is moved to a position coupled to the buffer reservoir whereupon the previously melted ink from the solid state supply may be coupled into the reservoir of the imaging head.

11 Claims, 5 Drawing Figures

BUFFER RESERVOIR FOR INK JET APPARATUS AND METHOD

BACKGROUND OF THE INVENTION

This invention relates to an ink jet where the ink within the jet is of the phase change type which may be referred to as hot melt ink.

The phase change or hot melt ink of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984. The hot melt ink may be jetted from a variety of apparatus including those disclosed in the aforesaid copending application.

When employing ink in a liquid state, the delivery of ink is, of course, dictated by the liquid state. Typically, the ink is contained within a closed vessel of some sort prior to delivery to the ink jet. When employing hot melt ink, the delivery of the ink requires different solutions in order to provide a reliable supply and minimize operator intervention. At the same time, it is undesirable to heat an entire supply of hot melt ink at all times since the extended cooking of the hot melt ink may result in degradation of the ink.

In copending application Ser. No. 660,655, filed Oct. 15, 1984, a melt-on-demand system for supplying ink to a reservoir carried by an ink jet imaging head is disclosed. By melting the ink on demand, extended cooking of the ink is avoided as well as the resulting degradation of ink. The amount of ink which may be utilized in such a system is limited by the amount of ink which may be carried on the imaging head.

In copending application Ser. No. 661,701, filed Oct. 16, 1984, a fixed or stationary supply of solid state ink is periodically heated on demand so as to deliver melted ink to a smaller reservoir carried by the imaging head. Such an apparatus avoids extended cooking of the ink in the solid state supply. At the same time, it is not necessary to carry a large volume of ink in the solid state as well as the liquid state in the reservoir carried by the imaging head since the reservoir of the imaging head may be replenished with liquid ink on a periodic basis by moving to a position of coupling to the solid state ink supply.

In accordance with the invention of the aforesaid copending application Ser. No. 661,701, replenishing of the reservoir carried by the imaging head must await the heating of the solid state ink in the solid state ink supply. In other words, a supply of melted ink is not available for instantaneous replenishing of the imaging head reservoir on demand.

SUMMARY OF THE INVENTION

It is an object of this invention to provide a hot melt ink delivery system where operator handling of the ink is minimized.

It is a further object of this invention to provide a hot melt ink delivery system where ink may be reliably supplied to the ink jet apparatus.

It is a further object of this invention to minimize extended heating and resulting degradation of the ink.

It is still further object of this invention to provide a hot melt delivery system wherein a large supply of ink is provided without requiring operator intervention.

It is yet another object of this invention to provide a hot melt ink delivery system wherein ink in the liquid state is ready and available on demand.

In accordance with these and other objects of the invention, a preferred embodiment comprises an ink jet apparatus for storing ink in solid state at a fixed location and a scanning head employing at least one ink jet and an associated reservoir. The improvement comprises a buffer reservoir which may be filled with melted ink on demand and utilized to subsequently fill the associated reservoir of the scanning head so as to assure melted ink on a standby basis while at the same time avoiding prolonged heating of the entire supply of solid state ink.

In accordance with this invention, the buffer reservoir is maintained in a fixed position relative to a means for storing ink in a solid state, and the imaging head including the associated reservoir may be moved to a position coupled to the buffer reservoir for filling the associated reservoir.

In further accordance with this invention, the ink within the buffer reservoir is maintained in a melted state. This may be accomplished by sensing the level of ink in the buffer reservoir and heating the ink in solid state in response to the sensing.

In still further accordance with this invention, the level of ink in the reservoir associated with the imaging head is sensed and the associated reservoir is filled with melted ink from the buffer reservoir in response to the sensing. Preferably, the filling of the associated reservoir is also done in response to the sensing of the position of the scanning head.

In a preferred embodiment of the invention, the buffer reservoir includes heating means for maintaining the liquid in a liquid state within the buffer reservoir. Preferably, the buffer reservoir also includes a level sensing means as well as valve means for controlling the filling of the reservoir associated with the imaging head from the buffer reservoir.

DETAILED DESCRIPTION OF A PREFERRED EMBODIMENT

Figure 1:
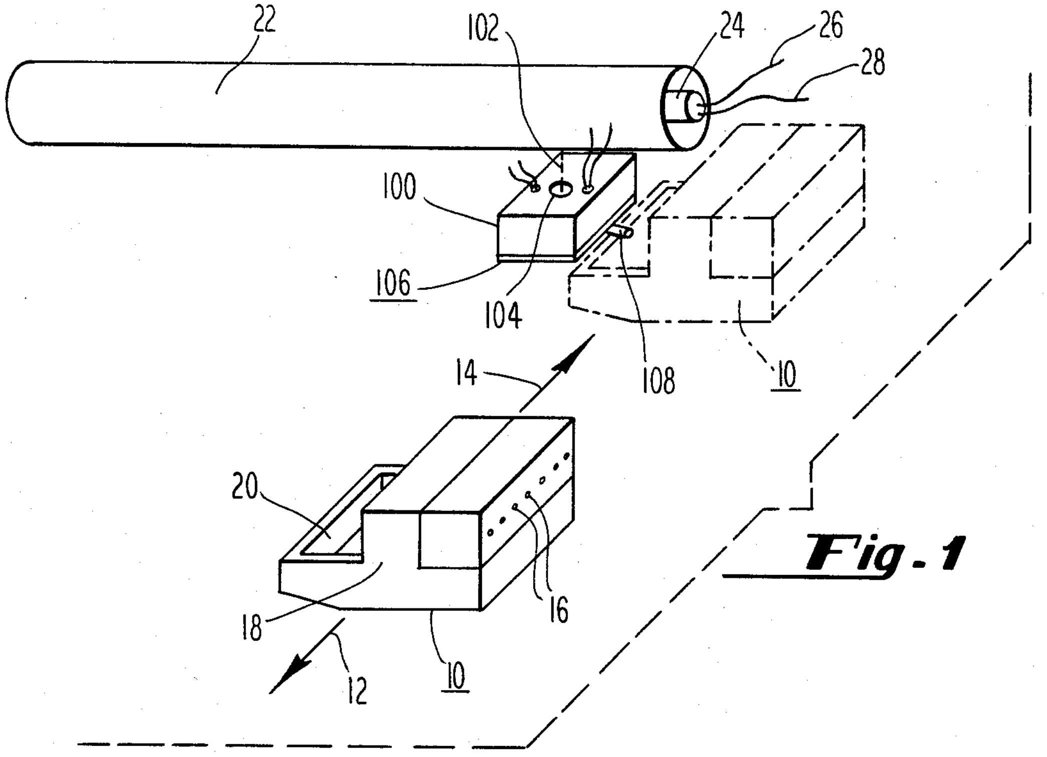
FIG. 1 is a perspective view of an ink jet apparatus representing a preferred embodiment of the invention.

Referring to FIG. 1, an ink jet apparatus is disclosed including an ink jet head 10 mounted for movement along a scanning path depicted by arrows 12 and 14. The head 10 includes ink jet imaging systems supplying an array of ink jets having orifices 16. The head 10 includes an on-board or associated reservoir 18 supplied by a trough 20 located at the rear of the head 10.

The reservoir 18 is of a limited capacity. In other words, the reservoir 18 is capable of storing a volume of ink which is heated by a heater not shown so as to assure the operation of the ink jets for a reasonable period of time for a reasonable rate of printing. However, the volume of ink is limited.

In order to supply further ink to the reservoir 18 of the head 10, the head 10 is capable of movement to a refill position shown in phantom. In the refill position, the head 10 is located below a much larger supply of ink.

In accordance with this invention, the larger supply of ink comprises a solid state ink supply 22 in conjunction with a buffer reservoir 100. As shown, the solid state supply 22 includes a heater 24 electrically supplied by leads 26 and 28. When the heater 24 is energized so as to melt down the block of solid state ink, the melted ink in the liquid state flows along a path 102 into an opening 104 in the buffer reservoir 100.

The melted ink which enters the buffer reservoir 100 is maintained in the melted state by a heater 106 at the base of the reservoir 100. An outlet 108 near the base of the reservoir 100 extends outwardly to a position over the trough 20 so as to allow the melted ink to flow into the trough 20 and on into the reservoir 18 of the head 10.

Figure 2:
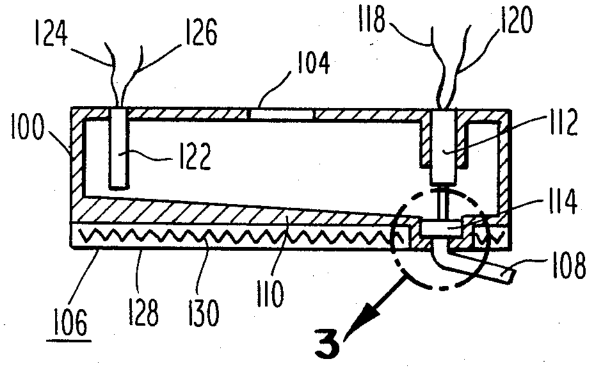
FIG. 2 is a sectional view of a buffer reservoir shown in FIG. 1.
Figure 3:
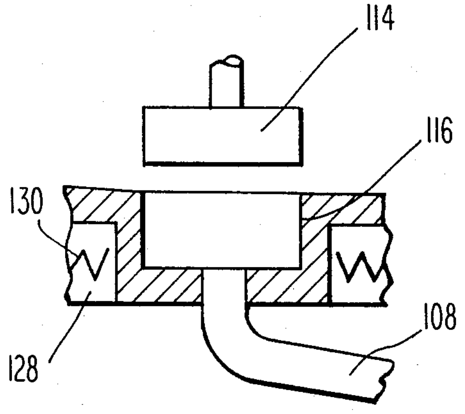
FIG. 3 is an enlarged sectional view of a portion of FIG. 2.

The nature of the buffer reservoir 100 may be further understood with reference to FIGS. 2 and 3 in conjunction with FIG. 1. As shown in FIG. 2, the base 110 of the reservoir 100 is sloped down to the outlet 108. In order to control the flow of ink out of the outlet 108, a valve 112 is provided. As shown in the enlarged view of FIG. 3, the valve 112 including valve member 114 may be opened so as to allow the melted ink to drain out through the outlet 108. When it is desired to close the outlet 108 so as to prevent the outward flow, the valve element 114 is lowered into a seat 116 to the position shown in FIG. 2. As shown, a valve 112 is activated by the application of a signal to leads 118 and 120.

As also shown in FIG. 2, the reservoir 100 includes the level sensing element 122 having leads 124 and 126. The sensing element 122 may sense the level of the ink within the reservoir 100 by capacitive sensing or other means. For example, the element 122 may comprise a thermocouple which senses the temperature around the element 122 which varies as a function of the level of the melted ink.

FIG. 2 also shows in some detail the nature of a plate 128 which serves as the heater located at the base of the buffer reservoir 100. Plate 128 includes an embedded heater element 130. Although not shown, it will be understood that a thermostat is preferably associated with the heater 106 so as to assure a uniform temperature of the melted ink and thereby minimize the possibility of degradation or variations in the performance of the ink jets as a function of temperature of the ink.

It will be appreciated that various functions depicted in FIG. 1 will require some control. In this connection, conventional circuitry may be utilized or a microprocessor. Various control functions for either are depicted in FIG. 4.

Figure 4:
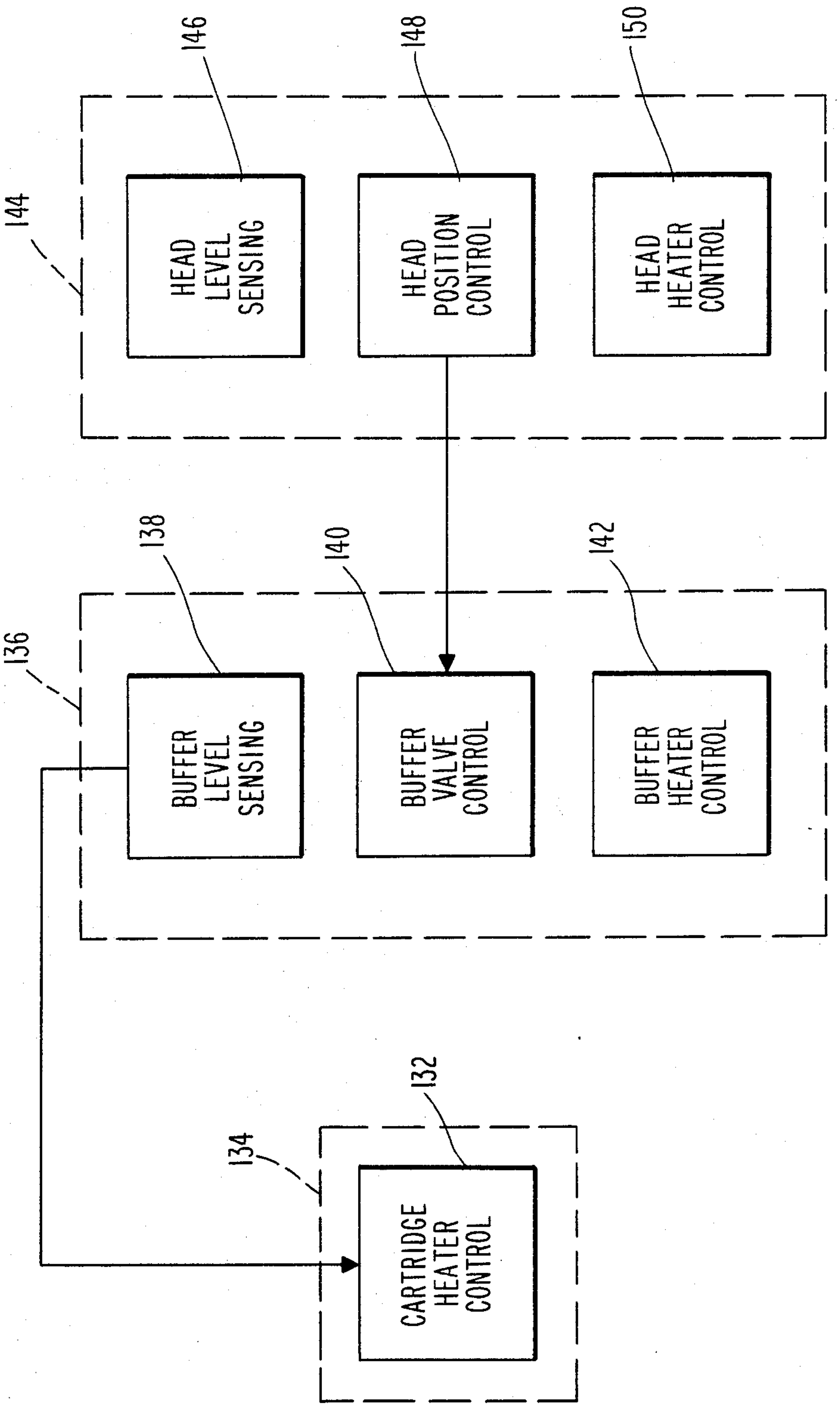
FIG. 4 is a block diagram depicting the control features of the apparatus shown in FIGS. 1 through 3.

As shown in FIG. 4, a solid state ink supply or cartridge 22 must be properly heated to supply ink to the buffer reservoir 100. As shown in FIG. 4, cartridge heater control 132 is one aspect of cartridge control 134.

As also shown in FIG. 4, there are various aspects of buffer control 136. Buffer control 136 includes buffer level sensing 138 as accomplished by the element 122 as shown in FIG. 2. The cartridge heater control 132 responds to the buffer level sensing so as to elevate the temperature within the cartridge 22 as shown in FIG. 1 and thereby heat and melt solid state ink so as to supply the necessary ink to the buffer reservoir 100.

Buffer reservoir control 136 also includes buffer valve control 140 as well as buffer heater control 142. As will now be explained, the buffer valve control 140 is responsive to the sensing of the level of ink in the imaging head 10 as well as the position of the head 10.

Head control 144 includes the function of head level sensing 146, head position control 148 and head heater control 150. When the level of ink within the head 10 reaches a predetermined level, this level will be sensed to initiate the repositioning of the head 10 in response to head position control 148. Once the head is in the proper position, buffer control 140 will respond so as to open the valve and allow ink to flow from the outlet 108 as shown in FIGS. 1 through 3 and into the trough 20 of the head 10. The head heater control 150 as shown in FIG. 4 includes thermostatic control of the temperature within the head 10 so as to control the temperature of the ink to assure proper performance of the ink jet.

From the foregoing, it will be appreciated that a relatively small volume of melted ink from a solid state ink supply 22 may be utilized to fill the buffer reservoir with melted ink and that ink is subsequently utilized to fill the reservoir 18 associated with the ink jet head. As shown in FIG. 1, the buffer reservoir 100 is maintained in a fixed or stationary position while the reservoir 18 associated with the head moves through a variety of scanning positions to the fixed filling position depicted in phantom in FIG. 1.

In accordance with an important aspect of the invention, the buffer reservoir 100 is maintained in a heated state during the operation of the ink jets so as to assure a ready supply of melted ink for the reservoir 18 in the event that the supply of melted ink in the reservoir 18 reaches a predetermined low level.

Figure 5:
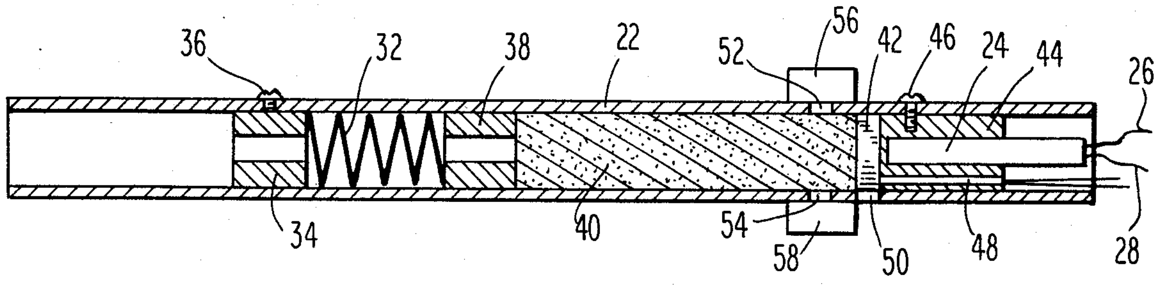
FIG. 5 is a sectional view of the solid state ink supply mechanism shown in FIG. 1.

Referring now to FIG. 5, the supply of cartridge 22 is shown as including a housing and a helical spring 32 which abuts a fixed member 34 secured to the housing by a screw 36. The other end of the spring 32 abuts a transparent or translucent movable insert 38 which is in contact with one extremity of a block of ink 40 in solid state form. The other end of the block 40 abuts a heater housing 44 having a groove 42 juxtaposed to the heater 24 which is enclosed within the housing 44 held in place by a screw 46. The housing 44 includes a thermistor 48.

As the heater 24 is elevated in temperature, the extremity of the block 40 abutting the plate 42 will melt. The melted ink then flows through an aperture 50 in the tubular housing 22. It is flow from the aperture 50 which creates the flow of melted ink 102 shown in FIG. 1.

As also shown in FIG. 5, the cartridge 22 includes apertures 52 and 54 associated with a light source 56 and a light detector 58. When a sufficient quantity of ink is present to block the light from the source 56 from being detected by the detector 58, the resulting signal generated by the detector indicates an adequate quantity of ink 40. However, when the quantity of ink 40 is no longer capable of blocking the detector 58, the detector 58 will indicate a low supply.

The foregoing details of the cartridge 22 are disclosed in copending application Ser. No. 661,701 filed Oct. 16, 1984. These and other details concerning the cartridge 22 as disclosed in the aforesaid application are incorporated herein by reference.

Particular details of the imaging head are disclosed in copending U.S. applications Ser. No. 336,603, filed Jan. 4, 1982, Ser. No. 576,582, filed Feb. 3, 1984, and Ser. No. 661,794, filed Oct. 17, 1984 which are assigned to the assignee of this invention and incorporated herein by reference. The particular hot melt ink which could be utilized is disclosed in U.S. Pat. No. 4,390,369 and copending U.S. applications Ser. No. 644,542, filed Aug. 27, 1984, Ser. No. 610,627, filed May 16, 1984 and Serial No. 565,124, filed Dec. 23, 1983, which are assigned to the assignee of this invention and incorporated herein by reference.

The reservoir 18 may comprise elements disclosed in copending U.S. patent application Ser. No. 661,925, filed Oct. 16, 1984, which is assigned to the assignee of this invention and incorporated herein by reference.

Although a preferred embodiment of the invention has been shown and described, it will be understood that other embodiments and modifications will fall within the true spirit and scope of the invention as set forth in the appended claims.

I claim:

1. A method of operating an ink jet apparatus comprising means for storing ink in solid state at a fixed location, scanning at least one ink jet and an associated reservoir along a series of locations, moving said at least one ink jet and associated reservoir with respect to said fixed location on demand, and melting said solid state ink on demand, the improvement comprising:

filling a buffer reservoir for ink with the melted ink on demand with a first volume of ink;

subsequently filling said associated reservoir with the melted ink from said buffer reservoir with a lesser volume of ink than said first volume;

supplying melted ink from said associated reservoir to said at least one jet; and repeatedly filling said associated reservoir and supplying melted ink to said at least one jet before again filling said buffer reservoir.

2. The method of claim 1 including the following steps:

maintaining said buffer reservoir in a fixed position coupled to said means for storing ink; and moving said associated reservoir to a position coupled to said buffer reservoir; and filling said associated reservoir with melted ink from said buffer reservoir.

3. The method of claim 1 including the following steps:

heating said buffer reservoir so as to continuously maintain the melted ink in said buffer reservoir in a liquid state.

4. The method of claim 1 including the following steps:

sensing the level of ink in said buffer reservoir; and heating the ink in the solid state in response to the sensing so as to melt the ink for filling the buffer reservoir.

5. The method of claim 1 including the following steps:

sensing the level of ink in said associated reservoir; and filling said associated reservoir with melted ink from the buffer reservoir in response to the sensing.

6. The method of claim 5 including the following steps:

sensing the position of the scanning head; and filling said associated reservoir in response to the sensing of said level and said position.

7. Ink jet apparatus comprising a scanning ink jet head having a head reservoir and at least one ink jet, solid state ink supply means mounted in a fixed location and means for heating and melting the ink from solid state supply means on demand, the improvement comprising buffer reservoir means coupled to said supply means and said head reservoir for receiving melted ink on demand and subsequently supplying said melted ink to said head reservoir, said buffer reservoir having a substantially greater capacity than the head reservoir; and means for permitting the filling of said head reservoir periodically without filling said buffer reservoir.

8. Ink jet apparatus of claim 7 wherein said buffer reservoir is mounted in a fixed location.

9. The ink jet apparatus of claim 7 wherein said buffer reservoir comprises heater means for maintaining the liquid ink in the liquid state.

10. The ink jet apparatus of claim 7 wherein said buffer reservoir comprises level sensing means.

11. The ink jet apparatus of claim 7 wherein said buffer reservoir comprises valve means.

* * * * *